3,272,833
CERTAIN SUBSTITUTED 5-NITRO-2-
FURYLAMIDOXIMES
Anne Mary Von Esch, North Chicago, and Aldo J. Crovetti, Lake Forest, Ill., assignors to Abbott Laboratories, North Chicago, Ill., a corporation of Illinois
No Drawing. Filed Oct. 9, 1963, Ser. No. 314,875
6 Claims. (Cl. 260—295.5)

This invention is concerned with compounds of the formula

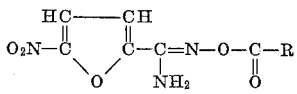

as well as non-toxic salts thereof and the method for their preparation. In this and succeeding formulas, R represents hydrogen, arylthioloweralkyl, arylloweralkyl, aryloxyloweralkyl, loweralkenyl, carboloweralkoxyvinyl, diloweralkylamino, carboloweralkoxy, carboloweralkoxyloweralkyl, halophenyl, loweralkoxyphenyl, hydroxyphenyl, cyanoloweralkyl, loweralkylthiophenyl, nitrophenyl, aminophenyl, halosulfonamidophenyl, sulfonamidophenyl, pyridyl, furyl, thienyl, halofuryl, halothienyl, pyrimidyl, oxazyl, isoxazyl, imidazyl, pyrazinyl, thiazyl, isoquinolyl, quinolyl, pyrazyl, furylloweralkyl or thienylloweralkyl.

The terms "loweralkyl" and "loweralkoxy" include the straight and branched alkyl and alkoxy radicals containing from one to five carbon atoms, inclusive. The term "non-toxic salts" as employed herein refers to acid-addition salts of the suitably basic compounds above such as the hydrochloride, sulfate, stearate, citrate, lactate and the like, as well as the quaternary ammonium salts of said compounds wherein quarternization occurs on a nuclear nitrogen atoms in the R substituents which contain such a nitrogen and are capable of forming quaternary ammonium salts as for example, the methosulfate, methiodide, methochloride, and the like.

These novel compounds are active antibacterial and antifungal agents. For this reason, they can be employed in disinfectant composition to control a variety of microorganisms such as *Salmonella typhimurium, Escherichia coli, Proteus vulgaris* and Alternaria species. In such use, the compounds are dispersed on an inert solid or in a suitable liquid (preferably water) and applied as a dust or spray. In a representative operation, good control of the above-named organisms was obtained when the methiodide salt of the compound wherein R was nicotinyl in the general formula above was employed in an aqueous medium at a concentration of about 50 parts per million. In addition, these compounds are active against *Trichomonas vaginalis* when applied topically at a concentration of 50 parts per million or less.

The compounds of the present invention are prepared by the reaction of the equimolar proportions of 5-nitro-2-furylamidoxime and a compound of the formula RCOX wherein X is chlorine or bromine in the presence of an inert solvent such as acetone and a hydrohalide acceptor such as potassium carbonate. Good results are obtained when the amidoxime and hydrohalide acceptor are dissolved in the solvent, cooled to about 0° C. and the R-substituted acid halide also dissolved in the same solvent is added dropwise thereto with rapid stirring. When the addition is complete, stirring is continued at room temperature for several hours. The solid which forms is eventually recovered by filtration or concentration, washed with water, dried and recrystallized from a suitable solvent such as acetonitrile or dimethylformamide.

The acid-addition salts of suitable compounds of this invention are prepared in the usual manner by the reaction of the compounds per se with a suitable acid in an inert organic solvent (preferably alcohol) and separating the acid-addition salt which precipitates by filtration. The quaternary ammonium salts may likewise be prepared by conventional means, as for example, by heating a free base with a quaternizing agent such as an alkylsulfate, loweralkyl halide or other suitable agent.

The following examples are presented to illustrate rather than limit the invention.

*Example 1.—O-nicotinoyl-5-nitro-2-furylamidoxine*

To 15 grams (0.08 mole) of 5-nitro-2-furylamidoxime, 6.05 grams (0.04 mole) of potassium carbonate in 175 ml. of acetone was added slowly with stirring and cooling, a solution of 12.4 grams (0.08 mole) of nicotinoyl chloride (B.P.=90° C. at 15 mm. pressure) in 50 ml. of acetone. The mixture was then stirred at room temperature for 5 hours. The solid which formed was filtered off and crystallized from a dimethylformamide-water mixture to obtain the desired product which melted at 211° C.

Analysis. — Calculated: C=47.83%; H=2.92%; N=20.32%. Found: C=48.09%; H=2.90% N=20.75%.

A 2.5 gram portion of the above product was heated with 1.3 grams of methyl iodide in nitromethane on a steam bath for 2.5 hours. The methiodide salt which formed was separated by filtration and after crystallization from a dimethylformamide-alcohol mixture was found to melt at 200° C.

*Example 2.—O-2-furoyl-5-nitro-2-furylamidoxime*

This compound was prepared by reacting 2-furoyl chloride with an equimolar amount of 5-nitro-2-furylamidoxime as described in Example 1. M.P.=222° C.

Analysis. — Calculated: C=45.29%; H=2.66%; N=15.88%. Found: C=45.37%; H=2.65%; N=16.02%.

*Example 3.—O-β-carbomethoxypropionyl-5-nitro-2-furylamidoxime*

This compound was prepared in a similar manner by reacting carbomethoxypropionyl chloride with an equivalent amount of 5-nitro-2-furylamidoxine. The desired product melted at 143°–145° C. with decomposition.

Analysis. — Calculated: C=42.11%; H=3.87% N=14.73%. Found: C=41.81%; H=3.99%; N=14.83%.

*Example 4.—O-crotonyl-5-nitro-2-furylamidoxime*

This compound was obtained by reacting equimolar amounts of crotonyl chloride and 5-nitro-2-furylamidoxime. The product was isolated after filtration and concentration of the acetone solution. After crystallization from ethanol, the product melted at 182°–184° C. with decomposition.

Analysis. — Calculated: C=45.19%; H=3.79%; N=17.57%. Found: C=45%; H=4.03%; N=17.70%.

In like manner, the reaction of the appropriate R-substituted acid chloride or bromide wherein R is as hereinbefore indicated with 5-nitro-2-furylamidoxime will evolve hydrohalide of reaction and result in the formation of the corresponding R-substituted 5-nitro-2-furylamidoximes. Representative of such compounds considered to be within the scope of this invention are:

O-formyl-5-nitro-2-furylamidoxime
O-thienoyl-5-nitro-2-furylamidoxime
O-picolinoyl-5-nitro-2-furylamidoxime
O-paranitrobenzoyl-5-nitro-2-furylamidoxime
O-5-bromofuroyl-5-nitro-2-furylamidoxime
O-5-bromothienoyl-5-nitro-2-furylamidoxime
O-parasulfonamidobenzoyl-5-nitro-2-furylamidoxime O-4-chloro-3-sulfonamidobenzoyl-5-nitro-2-furylamidoxime
O-phenylacetyl-5-nitro-2-furylamidoxime
O-thiophenoxyacetyl-5-nitro-2-furylamidoxime
O-phenoxyacetyl-5-nitro-2-furylamidoxime
O-cyanoacetyl-5-nitro-2-furylamidoxime
O-carbomethoxyoxalyl-5-nitro-2-furylamidoxime
O-carbomethoxyfumaryl-5-nitro-2-furylamidoxime
O-orthochlorobenzoyl-5-nitro-2-furylamidoxime
O-paramethoxybenzoyl-5-nitro-2-furylamidoxime
O-N,N-diethylcarbamoyl-5-nitro-2-furylamidoxime
O-3,4,5-trihydroxybenzoyl-5-nitro-2-furylamidoxime
O-2,4-dihydroxybenzoyl-5-nitro-2-furylamidoxime
O-orthohydroxybenzoyl-5-nitro-2-furylamidoxime
O-paraaminobenzoyl-5-nitro-2-furylamidoxime
O-orthomethylthiobenzoyl-5-nitro-2-furylamidoxime
O-3-isoxazoyl-5-nitro-2-furylamidoxime
O-4(5)-imidazoyl-5-nitro-2-furylamidoxime
O-4-oxazoyl-5-nitro-2-furylamidoxime
O-2-pyrimidoyl-5-nitro-2-furylamidoxime
O-2-pyrazinoyl-5-nitro-2-furylamidoxime
O-4-thiazoyl-5-nitro-2-furylamidoxime
O-2-quinoloyl-5-nitro-2-furylamidoxime
O-isoquinoloyl-5-nitro-2-furylamidoxime
O-furylacetyl-5-nitro-2-furylamidoxime
O-1-phenyl-4-pyrazoyl-5-nitro-2-furylamidoxime and
O-thienylacetyl-5-nitro-2-furylamidoxime.

We claim:
1. A compound of the formula

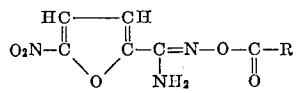

wherein R is selected from the group consisting of hydrogen, arylthioloweralkyl, arylloweralkyl, aryloxyloweralkyl, carboloweralkoxyvinyl, diloweralkylamino, loweralkenyl, carboloweralkoxy, carboloweralkoxyloweralkyl, halophenyl, cyanoloweralkyl, loweralkoxyphenyl, hydroxyphenyl, loweralkylthiophenyl, nitrophenyl, aminophenyl, sulfonamidophenyl, halosulfonamidophenyl, pyridyl, furyl, thienyl, pyrimidyl, oxazyl, isoxazyl, quinolyl, pyrazyl, halofuryl, halothienyl, furylloweralkyl, thienylloweralkyl, imidazyl, pyrazinyl, thiazyl and isoquinolyl and non-toxic salts thereof.

2. A compound as claimed in claim 1 in which R is nicotinyl.

3. The methiodide salt of the compound claimed in claim 2.

4. A compound as claimed in claim 1 in which R is furoyl.

5. A compound of the formula

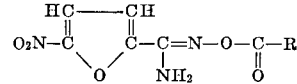

wherein R is selected from the group consisting of pyridyl, furyl, thienyl, pyrimidyl, oxazyl, isoxazyl, quinolyl, pyrazyl, halofuryl, halothienyl, furylloweralkyl, thienylloweralkyl, imidazyl, pyrazinyl, thiazyl, and isoquinolyl and non-toxic salts thereof.

6. A compound of the formula

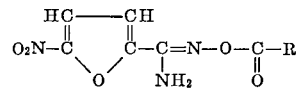

wherein R is selected from the group consisting of hydrogen, arylthioloweralkyl, arylloweralkyl aryloxyloweralkyl, carboloweralkoxyvinyl, diloweralkylamino, loweralkenyl, carboloweralkoxy, carboloweralkoxyloweralkyl, halophenyl, cyanoloweralkyl, loweralkoxyphenyl, hydroxyphenyl, loweralkylthiophenyl, nitrophenyl, aminophenyl, sulfonamidophenyl, and halosulfonamidophenyl.

References Cited by the Examiner

UNITED STATES PATENTS 3,084,170   4/1963   Von Esch et al. __ 260—347.7 XR

WALTER A. MODANCE, *Primary Examiner.*

ALAN L. ROTMAN, *Assistant Examiner.*